(12) United States Patent
Gopalakrishnan (10) Patent No.: US 9,658,838 B2
(45) Date of Patent: May 23, 2017

(54) OPTIMIZED JAVASERVER PAGES LIFECYCLE MODEL

(75) Inventor: Sumathi Gopalakrishnan, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1127 days.

(21) Appl. No.: 12/358,439

(22) Filed: Jan. 23, 2009

(65) Prior Publication Data
US 2010/0192136 A1 Jul. 29, 2010

(51) Int. Cl.
*G06F 9/45* (2006.01)

(52) U.S. Cl.
CPC .............. *G06F 8/427* (2013.01); *G06F 8/40* (2013.01); *G06F 8/41* (2013.01)

(58) Field of Classification Search
CPC .................................. G06F 8/427; G06F 7/00
USPC ................................................. 717/100–178
See application file for complete search history.

(56) References Cited

U.S. PATENT DOCUMENTS

| | | | |
|---|---|---|---|
| 5,923,880 A * | 7/1999 | Rose et al. ...................... | 717/145 |
| 6,675,354 B1 * | 1/2004 | Claussen et al. ............. | 715/205 |
| 6,697,849 B1 * | 2/2004 | Carlson ......................... | 709/219 |
| 6,874,141 B1 * | 3/2005 | Swamy et al. ................ | 717/144 |
| 7,117,436 B1 * | 10/2006 | O'Rourke et al. ............ | 715/205 |
| 7,316,003 B1 * | 1/2008 | Dulepet et al. ............... | 717/111 |
| 7,376,660 B2 | 5/2008 | Backhouse | |
| 7,401,325 B2 * | 7/2008 | Backhouse et al. .......... | 717/136 |
| 2005/0097522 A1 | 5/2005 | Backhouse et al. | |
| 2006/0075385 A1 * | 4/2006 | Backhouse ................... | 717/115 |
| 2007/0074124 A1 * | 3/2007 | Farn .............................. | 715/760 |
| 2007/0143748 A1 * | 6/2007 | Hennessy ..................... | 717/171 |

OTHER PUBLICATIONS

"Shannon Xu and Thomas Dean";"Modernizing JavaServer Pages by Transformation";"Sep. 26-26, 2005 "; Web Site Evolution, 2005. (WSE 2005). Seventh IEEE International Symposium "8 pages".*
Pierre Delisle et al., "JavaServer Pages™ Specification", Version 2.1; Overview pages and Chapter 1, Published: Santa Clara, CA; May 8, 2006.
Eric Armstrong et al., "The J2EE™ Tutorial for the Sun™ ONE Platform", pp. 1-pp. 474, Published: Feb. 13, 2003.

* cited by examiner

*Primary Examiner* — Wei Zhen
*Assistant Examiner* — Brahim Bourzik
(74) *Attorney, Agent, or Firm* — Miles & Stockbridge PC (57) ABSTRACT

Systems and methods are provided that service a JavaServer Page ("JSP"), including receiving a request for a JSP page, parsing source code for the JSP page, creating a tree of the parsed source code. executing the tree in memory, and returning the requested JSP page. Accordingly, JSP pages do not require repeated recompilation, and JSP pages with customized content may be quickly regenerated with a low performance overhead.

18 Claims, 7 Drawing Sheets

```
501   <%@ taglib uri="http://java.sun.com/jsp/jstl/core" prefix="c"%>
502   begin page
503   <c:out value="from hi"/>
504   <h1>hi</h1>
505   <jsp:include page="/examples/jsp/snp/snoop.jsp"/>
506   <c:if test="${param.test == 'a'}">
507   <c:out value="The parameter is ${param.test}"/> </c:if>
```

OPTIMIZED JAVASERVER PAGES LIFECYCLE MODEL

FIELD OF THE INVENTION

One embodiment is directed generally to JavaServer Pages, and more particularly to an optimized model for more efficient operation of a JavaServer Pages engine.

BACKGROUND INFORMATION

JavaServer Pages ("JSPs") are an extension to the Java servlet technology from Sun Microsystems that allows HyperText Markup Language ("HTML") code to be combined with Java code on the same page. The Java code provides the processing and the HTML provides the page layout that will be rendered in the Web browser. JSPs are the primary method in the Java 2 Enterprise Edition ("J2EE") platform for displaying dynamic Web pages. Special tags allow Java code to be included on the page as well as inserted into HTML statements without invalidating the HTML syntax. Thus, JSPs let non-Java programmers maintain HTML pages in their favorite authoring programs without interfering with the Java code on the page. With the use of standard and custom JSP tags, the Java code can be completely hidden.

At runtime, the application server turns the JSP into a Java servlet (e.g., .jsp file to .java file) using a JSP translator, which is a part of the servlet container. The servlet is then compiled into bytecode (.class) and run on the server like any other servlet. Just as a web server needs a servlet container to provide an interface to servlets, the server needs a JSP container to process JSP pages. The JSP container is responsible for intercepting requests for JSP pages and processes these requests in order to provide the JSP pages to the requester.

To process JSP elements, e.g., directive elements, action elements, and scripting elements, in the JSP page, the container first turns the JSP page into a servlet (known as the JSP page implementation class). The conversion involves converting all template text to println( ) statements and all JSP elements are converted to Java code that implements the corresponding dynamic behavior. The container then compiles the servlet class.

The steps of converting the JSP page to a servlet and compiling the servlet make up the translation phase. The JSP container initiates the translation phase for a page automatically when it receives the first request for the page. The JSP container is also responsible for invoking the JSP page implementation class (the generated servlet) to process each request and generate the response. This is called the request processing phase.

As an example of the phases of execution with regard to processing a request for a JSP from a client computing device, a client computing device may send a request for a JSP to a server that includes a JSP container. The server reads the JSP file from a file based I/O system and generates servlet Java code from the JSP file. The reading in of the JSP file and the generation of the servlet Java code from the JSP file constitute a translation phase of the processing of the JSP. Thereafter, the generated servlet Java code is compiled into a servlet class in a request processing phase. The server with the JSP container may then execute the servlet class to return the requested JSP content to the client computing device. As long as the JSP page remains unchanged, any subsequent request goes straight to the request processing phase, i.e., the JSP container on server simply executes the servlet class file. When the JSP page is modified, it goes through the translation phase again including the request processing phase.

The JSP container is often implemented as a servlet configured to handle all requests for JSP pages. In fact, these two containers, a servlet container and a JSP container, are often combined in one package under the name "web container." Typical JSP containers provide a rigid implementation for the management of JavaServer Page resources. Input resources, such as JSP pages, JSP documents, tagfiles and tag library descriptors ("TLDs") are expected to be read from file based input/output ("I/O") systems. Generated resources, such as the generated source code for the JSP servlet are also expected to be read from/written to file based I/O systems. However, the repeated compilation of Java code causes inefficiencies in the lifecycle of the JSP page, especially where custom pages need to be recompiled many times.

SUMMARY OF THE INVENTION

One embodiment is a method for an optimized JavaServer Page ("JSP") engine. The method includes receiving a request for a JSP page, parsing source code for the JSP page, creating a tree of the parsed source code, executing the tree in memory, and returning the requested JSP page.

DETAILED DESCRIPTION

Typically the lifecycle of a JSP page includes loading the JSP page, parsing the JSP page code, generating a .java code file, and executing Java .class file. Because of the dynamic nature of JSP pages, JSP page code must often be recompiled. An embodiment is directed to an optimized JSP engine operating under an optimized JSP lifecycle model. In this embodiment, the JSP page is loaded, the JSP source code is parsed, and a parse tree of the JSP source code is created. That parse tree may then be persisted in memory and executed on a runtime-basis. The result is a JSP engine that operates faster and more efficiently by obviating the need to recompile Java code. For more information on JSP pages, see the JavaServer Pages Specification, Version 2.1, from Sun Microsystems, Inc., available at http://jcp.org/about-Java/communityprocess/final/jsr245/index.html, and which is herein incorporated by reference.

Figure 1:
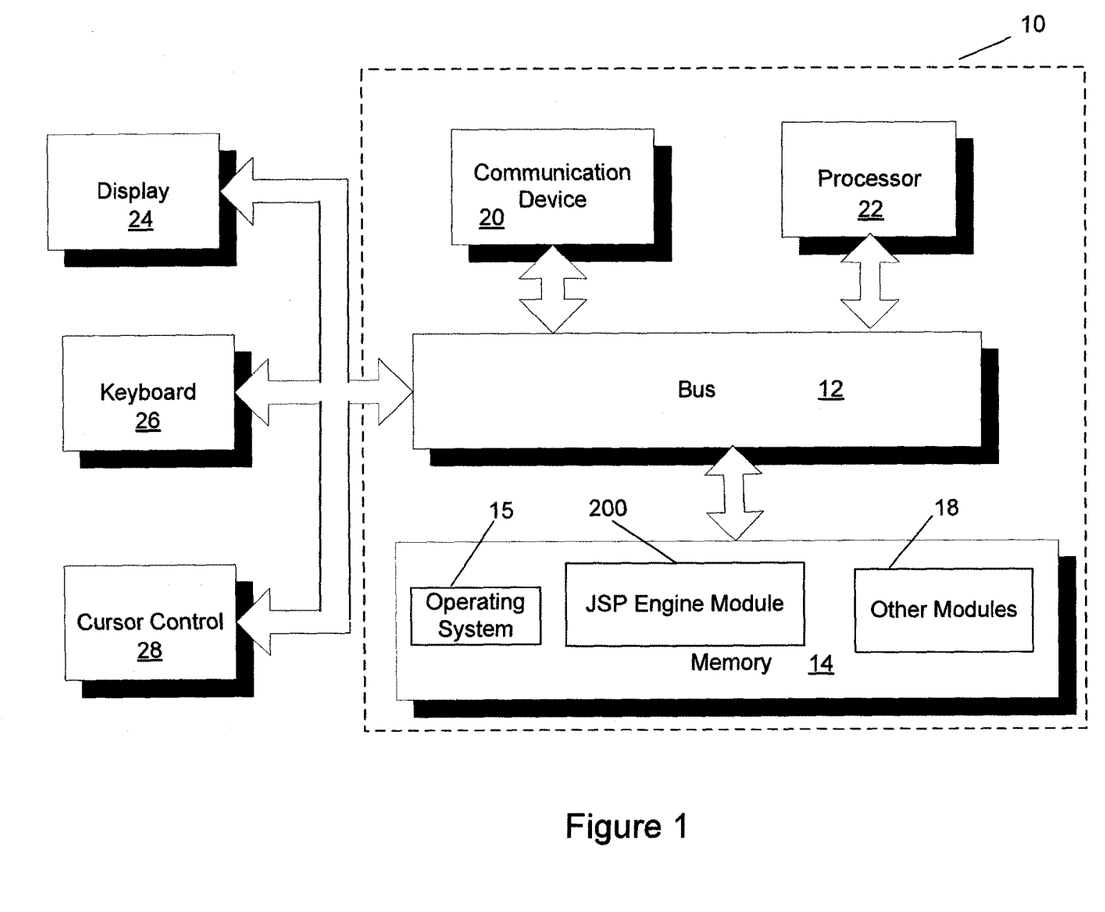
FIG. 1 is a block diagram of a system that can implement an optimized JSP engine in accordance with an embodiment.

FIG. 1 is a block diagram of a system 10 that can implement an embodiment of an optimized JSP engine. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a JSP engine module 200. These modules are described in greater detail below. Additional, fewer, and/or different modules 18 may also be included in system 10.

Figure 2:
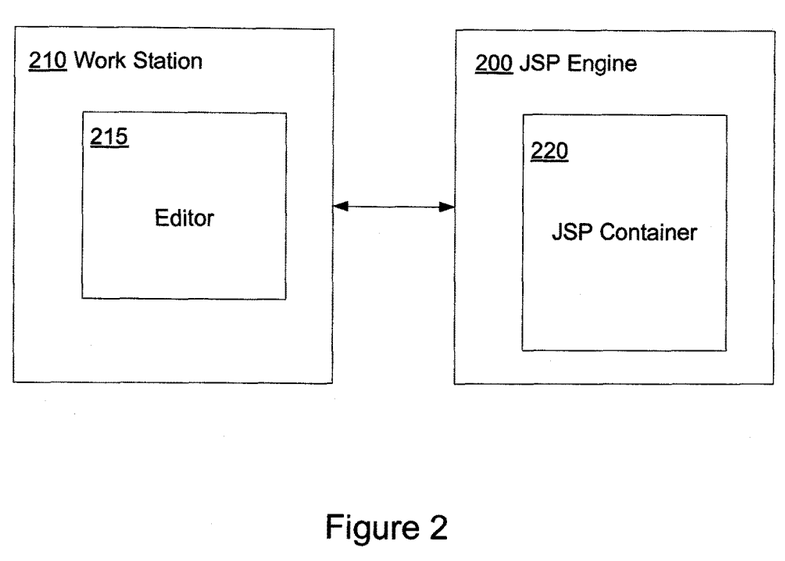
FIG. 2 illustrates an environment in which an embodiment may operate.

FIG. 2 illustrates an environment in which an embodiment may operate. Developer workstation 210 is a computer system communicating with JSP engine module 200 via a direct or indirect (e.g., network) connection. Editor 215 is a software tool for creating, viewing and editing a web page comprising dynamically generated content. In this embodiment of the invention, editor 215 is configured to deploy web page source code, comprising static code and/or dynamic code (i.e., code for generating dynamic content), to JSP container 220. JSP container 220 resides in JSP engine module 200, and is configured to receive web page source code from editor 215, and convert, compile, and/or execute dynamic web page source code elements within received source code. JSP container 220, when executing dynamic source code, may replace dynamic source code within the received source code with corresponding dynamically generated web page content. JSP container 220 may then return the dynamically generated web page to editor 215. As explained below, dynamic content is generated by executing a JSP component tree in memory, rather than repeated recompiling code.

Figure 3:
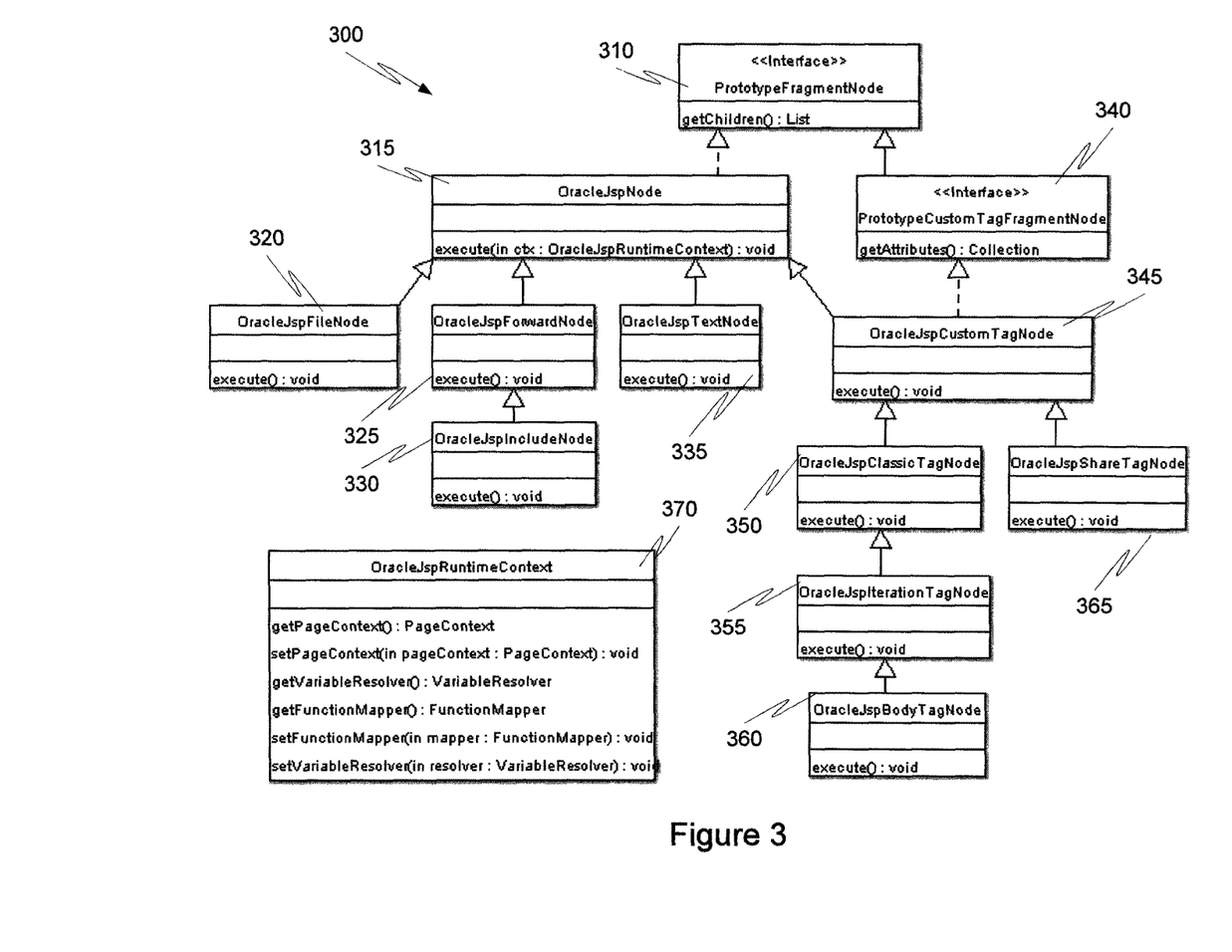
FIG. 3 illustrates a tree class definition in accordance with an embodiment.

JSP engine module 200 further includes a tree class definition 300, which is illustrated in FIG. 3. Tree class definition 300 defines a tree data structure for parsing the code of a JSP page. Tree class definition 300 includes an interface node, PrototypeFragmentNode 310, with one function, get Children ( ), that returns a list of child nodes. OracleJSPNode 315 inherits PrototypeFragmentNode 310, and has one function, execute (in ctx: OracleJSPRuntimeContext): void, that takes a runtime context as a parameter and returns void. OracleJSPFileNode 320 inherits OracleJSPNode 315, and has an execute function that executes the node and returns void. OracleJSPForwardNode 325 inherits OracleJSPNode 315, and has an execute function that executes the node and returns void. OracleJSPIncludeNode 330 inherits OracleJSPForwardNode 325, and has an execute function that executes the node and returns void. OracleJSPTextNode 335 inherits OracleJSPNode 315, and has an execute function that executes the node and returns void. Tree class definition 300 includes another interface node, PrototypeCustomTagFragmentNode 340, that includes one function, getAttributes ( ): Collection, that returns a collection of attributes. OracleJSPCustomTagNode 345 inherits PrototypeCustomTagFragmentNode 340 and OracleJSPNode 315, and has an execute function that executes the node and returns void. OracleJSPClassicTagNode 350 inherits OracleJSPCustomTagNode 345, and has an execute function that executes the node and returns void. OracleJSPIterationTagNode 355 inherits OracleJSPClassicTagNode 350, and has an execute function that executes the node and returns void. OracleJSPBodyTagNode 360 inherits OracleJSPIterationTagNode 355, and has an execute function that executes the node and returns void. OracleJSPShareTagNode 365 inherits OracleJSPCustomTagNode 345, and has an execute function that executes the node and returns void. Tree class definition 300 further includes OracleJSPRuntimeContenxt 370.

Figure 4:
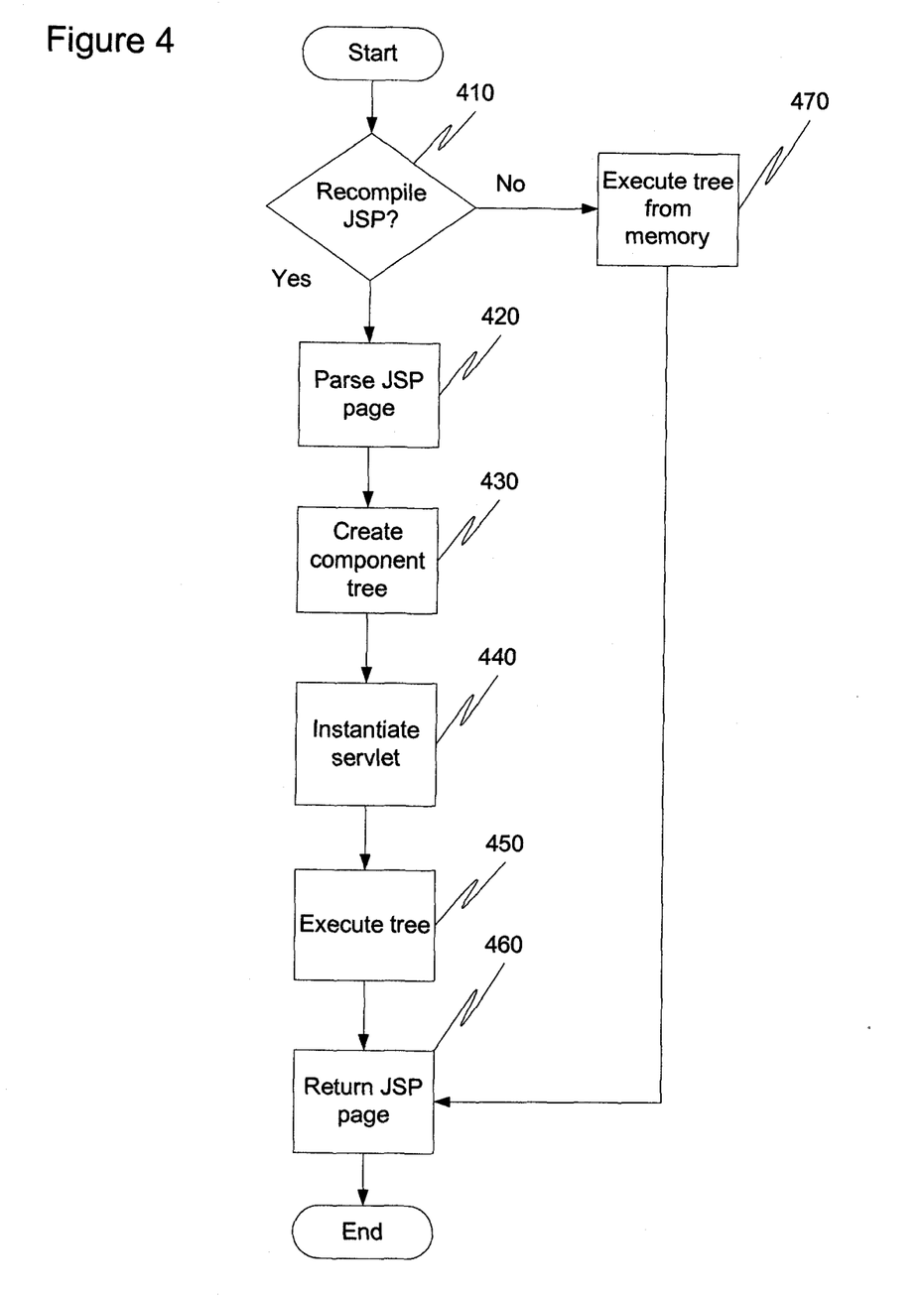
FIG. 4 illustrates a flow diagram of the functionality of a JSP engine module in accordance with an embodiment.

FIG. 4 illustrates a flow diagram of the functionality of JSP engine module 200 in accordance with an embodiment. In one embodiment, the functionality of the flow diagram of FIG. 4 is implemented by software stored in memory and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

When a request for a JSP is received, JSP engine module 200 determines whether recompilation is necessary (410). JSP engine module 200 may make this determination based on a timestamp of the requested JSP page, or other configurable logic. If no recompilation is needed, JSP engine module proceeds to execute the appropriate tree already in memory (470). If recompilation is necessary, JSP engine module 200 parses the JSP page (420), and creates a component tree representing the JSP page at runtime using the tree class 300 described with reference to FIG. 3 (430). JSP engine module 200 then instantiates a generic servlet to service the component tree, which sets a JSP file node to the root node of the component tree (440). The generic servlet services the component tree by traversing the tree and executing each node at runtime (450). The JSP engine module 200 then returns the requested JSP page to the requestor (460). Example pseudocode for a generic servlet consistent with an embodiment is described below:

```
public class ShortCutServlet extends
com.orionserver.http.OrionHttpJspPage
{
  OracleJspFileNode pageRoot;
  // Set the root PageNode that is returned from the parse layer
  public void
  setPageRootNode(oracle.jsp.runtime.tree.OracleJspFileNode t)
  {
     this.pageRoot = t;
  }
  public void _jspService(....) {
  /*
  ** Obtain page based variables from pageRoot object
  */
     response.setContentType(pageRoot.getContentType( ));
     .........// Create all implicit variables
     OracleJspRuntimeContext runtimeCtx = new
OracleJspRuntimeContext(pageContext,_ojsp_fMapper,_ojsp_varRes);
```

-continued

```
    try {
        // assuming only <jsp:forward> and <jsp:include>
        // standard actions and custom tags for time being
        pageRoot.execute(runtimeCtx);
    }
    ..............
  }
}
```

Figure 5:
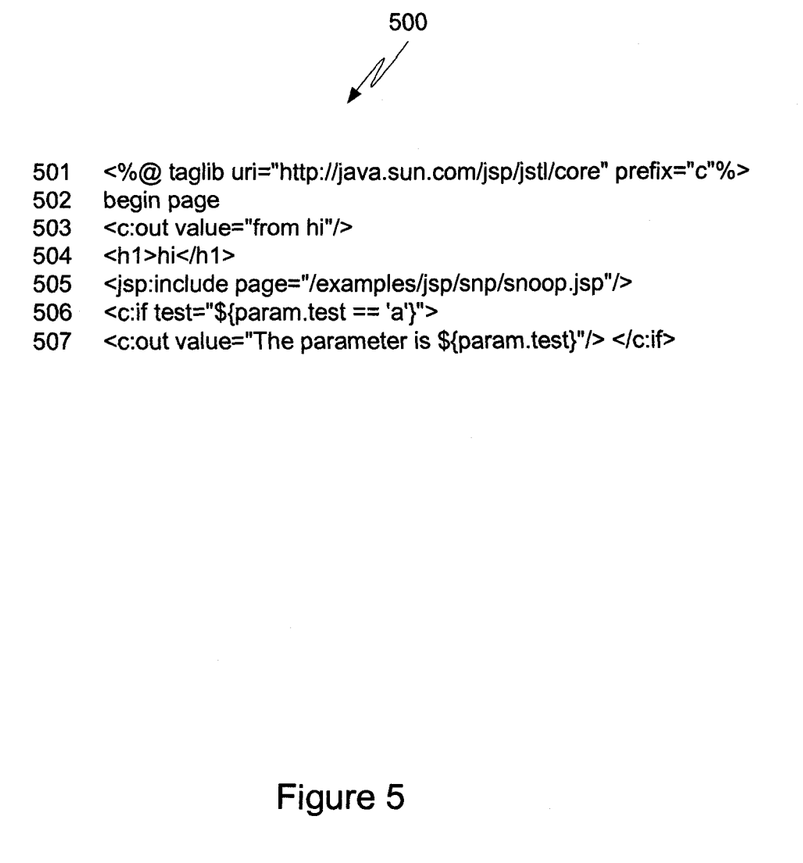
FIG. 5 illustrates example JSP code for a JSP page in accordance with an embodiment.

FIG. 5 illustrates example JSP code 500 for a JSP page in accordance with an embodiment. The JSP in the example is called test.jsp which expects a parameter called "test." An example URL for this JSP would be http://host:port/test.jsp?test=a. Line 501 is a directive that includes the core tag library. Line 502 is simple plaintext. Line 503 includes a core output tag, the output being "from hi." Line 504 is HTML that creates a header of the largest size that reads "hi." Line 505 calls a snoop JSP file that gets information about the host computer. While snoop.jsp is not defined here, those of ordinary skill in the art would be familiar with such an applet. Line 506 is an IF/THEN expression that evaluates whether the parameter "test" is equal to the letter "a." Line 507 directs that if "test" does equal "a," then the core output tag is used to out put "The parameter is a."

Figure 6:
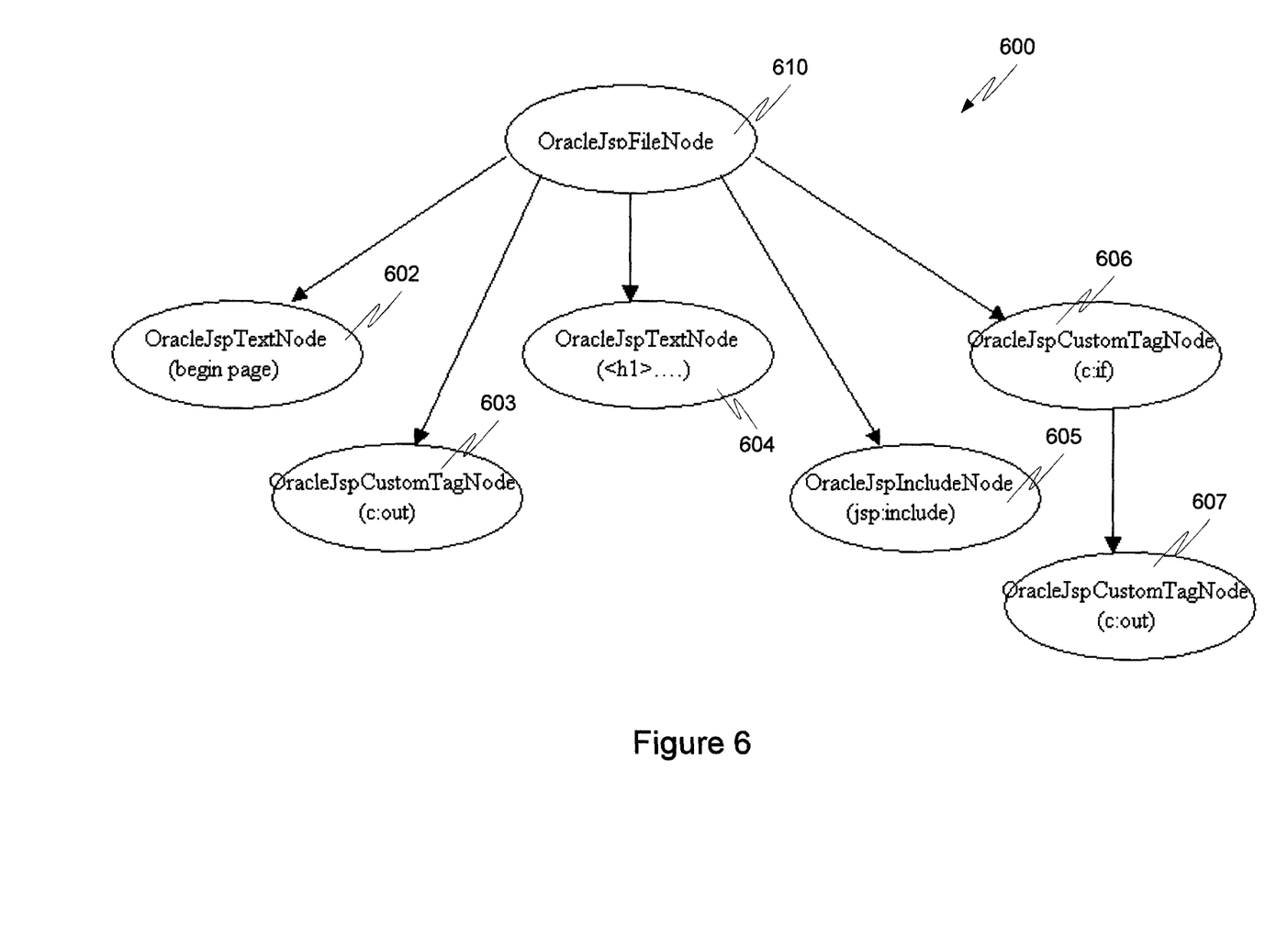
FIG. 6 illustrates an example tree created from parsing example JSP code in accordance with an embodiment.
Figure 7:
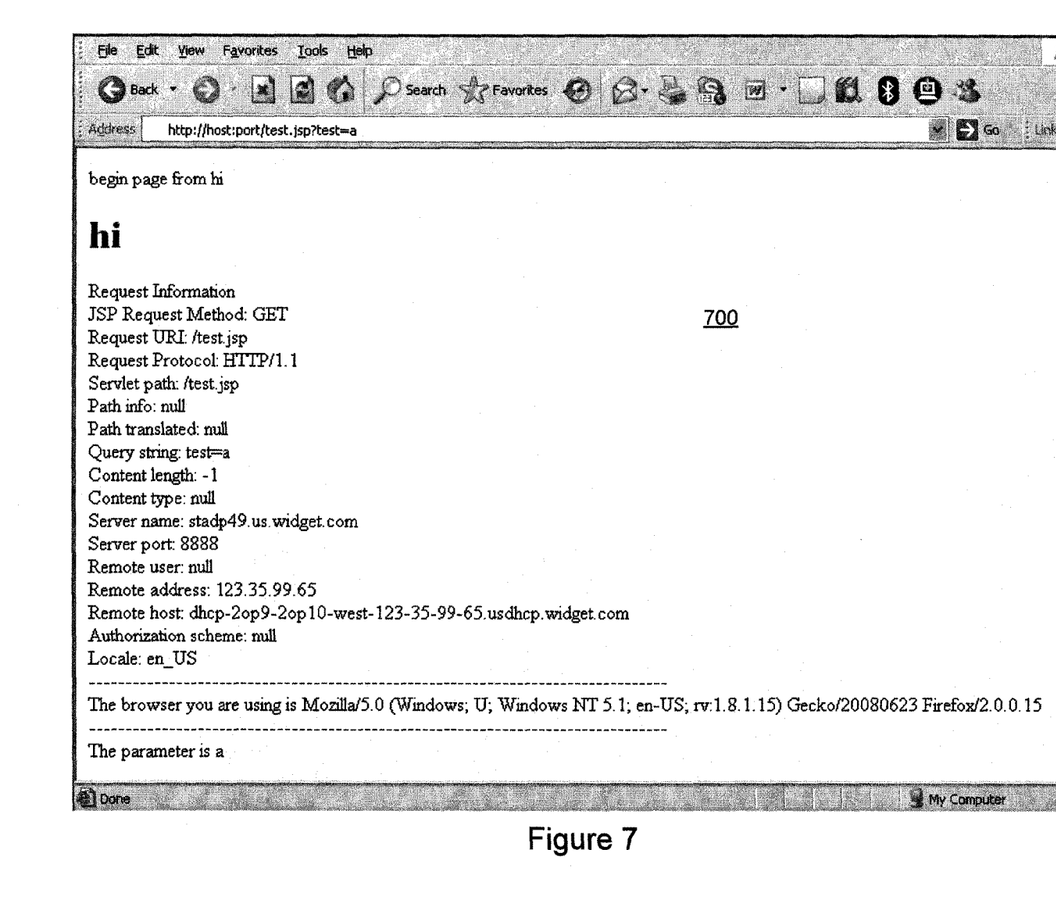
FIG. 7 illustrates example output of the execution of an example JSP page.

When JSP engine 200 parses this JSP code, tree class 300 is used to map the code to nodes of an instantiated tree. FIG. 6 illustrates an example tree 600 created from parsing example JSP code 500, and is described with additional reference to FIG. 5. The file itself, test.jsp, is mapped to a Oracle JSP file node 610. Execution of Oracle JSP file node 610 will include the core tag library inclusion in Line 501. Line 502 is mapped to Oracle JSP Text Node 602. Line 503 is mapped to Oracle JSP Custom Tag Node 603. Line 504 is mapped to Oracle JSP Text node 604. Line 505 is mapped to Oracle JSP Include node 605. Line 506 is mapped to Oracle Custom Tag node 606. Line 507 is mapped to Oracle Custom Tag Node 607, which is a child of node 606 as it depends on the outcome of the execution of node 606. When JSP tree 600 is executed, JSP engine 200 traverses the tree 600 from left to right, calling the execute( ) function of each node 602-607. Execution of this tree in memory produces example JSP output 700 illustrated in FIG. 7.

Accordingly, when test.jsp is called again, the tree 600 is already built in memory and Java code need not be recompiled. Typically, there are no alternatives for customized JSP applications, and thus the expensive performance overhead was necessary. The optimized JSP lifecycle model and engine described herein reduces the overhead of frequent parsing and code compilation. The table below illustrates the performance gain achieved by the optimized JSP lifecycle model over the conventional model:

|  | Compile/Generation Time (minutes) | CPU % |
|---|---|---|
| Conventional model | 270 | 98-99 |
| Optimized Model | 8 | 50 |

This data represents the time taken to compile and generate a JSP file of 11,540 bytes 10,000 times. The optimized model achieved this goal in 8 minutes, whereas the convention model took 270 minutes. Likewise, the conventional model required almost twice the percentage of CPU usage over the optimized model.

Accordingly, JSP pages may be loaded faster and more efficiently. Thus, tag handlers setter methods need not be called repeatedly, and no .java file is generated for each JSP file. In other words, Java code is not generated for the JSP page. By maintaining in-memory cache objects instead, a tree of tag instances is created and traversed during page execution at runtime.

Some embodiments of the invention have been described as computer-implemented processes. It is important to note, however, that those skilled in the art will appreciate that the mechanisms of the invention are capable of being distributed as a program product in a variety of forms. The foregoing description of example embodiments is provided for the purpose of illustrating the principles of the invention, and not in limitation thereof, since the scope of the invention is defined solely by the appended claims.

What is claimed is:

1. A computer-based method for servicing JavaServer Pages (JSPs), comprising:
    receiving a request for a JSP page with JSP source code;
    processing the JSP page without generating a .java code file, including:
        parsing the JSP source code for the JSP page,
        creating a tree of parsed JSP source code at runtime by mapping each portion of the parsed JSP source code to a corresponding node of the tree using a tree class definition,
        persisting the tree in a memory, and
        instantiating a generic servlet;
    executing the tree in the memory at runtime, using the generic servlet, including:
        traversing the nodes of the tree, and
        executing the portion of the parsed JSP source code mapped to each node of the tree;
    returning the requested JSP page; and
    in response to receiving a subsequent request for the JSP page, executing the tree in the memory at runtime without processing the JSP page.

2. The method of claim 1, further comprising determining whether the JSP page needs processing, and, if so determined, processing the JSP page without generating Java code.

3. The method of claim 2, wherein determining whether the JSP page needs processing is based on a timestamp of the JSP page.

4. A non-transitory computer-readable medium including instructions stored thereon that, when executed by a processor, cause the processor to service a JavaServer Page (JSP), the servicing comprising:
    receiving a request for a JSP page with JSP source code;
    processing the JSP page without generating a .java code file, including:
        parsing the JSP source code for the JSP page,
        creating a tree of parsed JSP source code at runtime by mapping each portion of the parsed JSP source code to a corresponding node of the tree using a tree class definition,
        persisting the tree in a memory, and
        instantiating a generic servlet;
    executing the tree in the memory at runtime, using the generic servlet, including:
        traversing the nodes of the tree, and
        executing the portion of the parsed JSP source code mapped to each node of the tree;
    returning the requested JSP page; and in response to receiving a subsequent request for the JSP page, executing the tree in the memory at runtime without processing the JSP page.

5. A system for servicing JavaServer Pages (JSPs), comprising:
   a memory configured to store a JSP engine module; and
   a processor, coupled to the memory, configured to execute the JSP engine module, the processor being further configured, while executing the JSP engine module, to:
   receive a request for a JSP page with JSP source code,
   process the JSP page without generating a java code file, including:
      parse the JSP source code for the JSP page,
      create a tree of parsed JSP source code at runtime by mapping each portion of the parsed JSP source code to a corresponding node of the tree using a tree class definition,
      persist the tree in memory, and
      instantiate a generic servlet,
   execute the tree in memory at runtime, using the generic servlet, by traversing the nodes of the tree and executing the portion of the parsed JSP source code mapped to each node of the tree, and
   return the requested JSP page, and
   receive a subsequent request for the JSP page, and, in response, execute the tree in the memory at runtime without processing the JSP page.

6. The non-transitory computer-readable medium of claim 4, the instructions further comprising determining whether the JSP page needs processing, and, if so determined, processing the JSP page.

7. The non-transitory computer-readable medium of claim 6, wherein determining whether the JSP page needs processing is based on a timestamp of the JSP page.

8. The system of claim 5, wherein, the processor is further configured, while executing the JSP engine module, to determine whether the JSP page needs processing, and, if so determined, to process the JSP page.

9. The system of claim 8, wherein determining whether the JSP page needs processing is based on a timestamp of the JSP page.

10. The method of claim 1, wherein executing the portion of the parsed JSP source code mapped to each node of the tree includes calling the execute( ) function of each node.

11. The non-transitory computer-readable medium of claim 4, wherein executing the portion of the parsed JSP source code mapped to each node of the tree includes calling the execute( ) function of each node.

12. The system of claim 5, wherein to execute the portion of the parsed JSP source code mapped to each node of the tree includes to call the execute( ) function of each node.

13. The method of claim 1, wherein the nodes of the tree of parsed JSP source code include a JSP file node, a JSP text node, a JSP custom tag node, and a JSP include node.

14. The method of claim 13, wherein execution of the JSP file node accesses at least one tag library.

15. The non-transitory computer-readable medium of claim 4, wherein the nodes of the tree of parsed JSP source code include a JSP file node, a JSP text node, a JSP custom tag node, and a JSP include node.

16. The non-transitory computer-readable medium of claim 15, wherein execution of the JSP file node accesses at least one tag library.

17. The system of claim 5, wherein the nodes of the tree of parsed JSP source code include a JSP file node, a JSP text node, a JSP custom tag node, and a JSP include node.

18. The system of claim 17, wherein execution of the JSP file node accesses at least one tag library.

* * * * *

UNITED STATES PATENT AND TRADEMARK OFFICE
CERTIFICATE OF CORRECTION

| | | |
|---|---|---|
| PATENT NO. | : 9,658,838 B2 | Page 1 of 1 |
| APPLICATION NO. | : 12/358439 | |
| DATED | : May 23, 2017 | |
| INVENTOR(S) | : Gopalakrishnan | |

It is certified that error appears in the above-identified patent and that said Letters Patent is hereby corrected as shown below:

On the Title Page

Column 2, under Abstract, Line 4, delete "code." and insert -- code, --, therefor.

In the Specification

In Column 4, Line 21, delete "Contenxt" and insert -- Context --, therefor.

In Column 5, Line 25, delete "out put" and insert -- output --, therefor.

In the Claims

In Column 7, Line 12, in Claim 5, delete "java" and insert -- .java --, therefor.

In Column 8, Line 10, in Claim 10, delete "( )function" and insert -- ( ) function --, therefor.

In Column 8, Line 14, in Claim 11, delete "( )function" and insert -- ( ) function --, therefor.

In Column 8, Line 17, in Claim 12, delete "( )function" and insert -- ( ) function --, therefor.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*